Sept. 6, 1927.

J. E. HOWELL ET AL 1,641,490

RETREADING MOLD

Filed Feb. 24, 1926

INVENTORS
J. E. Howell
G. E. Sapp

BY

ATTORNEY

Patented Sept. 6, 1927.

1,641,490

UNITED STATES PATENT OFFICE.

JOHN E. HOWELL AND GEORGE E. SAPP, OF SACRAMENTO, CALIFORNIA.

RETREADING MOLD.

Application filed February 24, 1926. Serial No. 90,271.

This invention relates to improvements in steam heated molds used in the automobile tire industry in connection with retreading operations.

With the form of mold at present used it is only possible to tread one-third or one-fourth of the circumference of the tire at one time, and various shiftings of the tire in the mold must therefore be made before the job is completed.

The principal object of our invention therefore is to provide a continuous mold so that the entire circumference of a tire may be treaded at one time. By reason of this construction the tire does not have to be shifted when once in place in the mold, and when removed from the mold the tire is in a finished condition throughout.

It will therefore be evident that the time of retreading operations is lessened considerably and three tires can be wholly retreaded with one of our molds in the same time necessary to retread only a single tire with the ordinary mold.

A further object of the invention is to arrange a mold structure so that large tires of relatively stiff and inflexible nature can be easily placed in the mold without destroying the tire or without undue physical effort.

A further object is to arrange the mold so that it is supported in a turnable manner, to enable the necessary clamps to be all applied while in the most convenient position.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
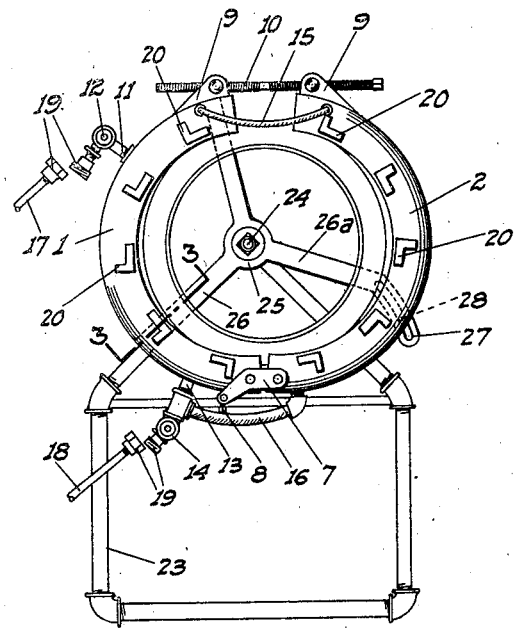
Fig. 1 is a side elevation of our improved mold as made for large tires, showing the mold sections partially separated to permit of the insertion of the tire.
Figure 2:
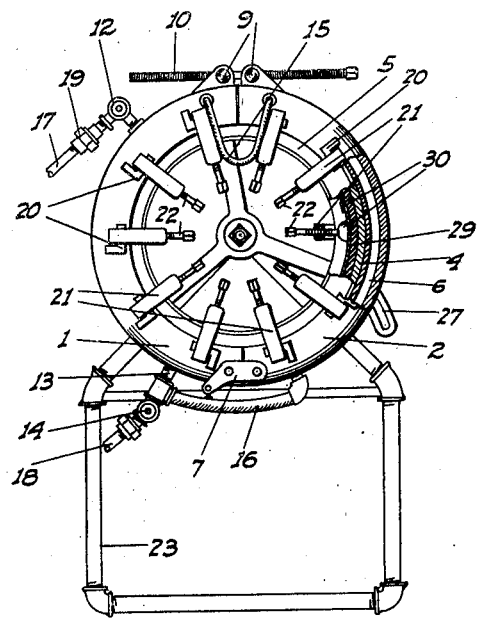
Fig. 2 is a similar view with the mold sections in their closed position and the clamps applied.
Figure 3:
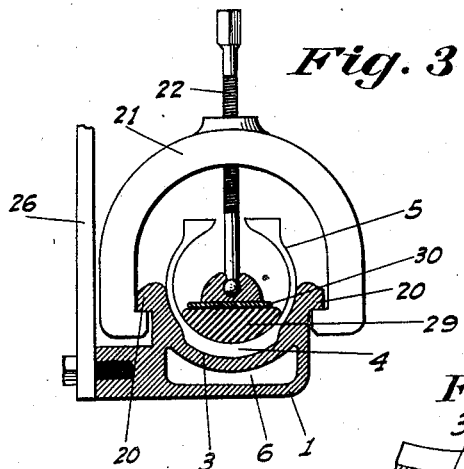
Fig. 3 is a top section on the line 3—3 of Fig. 1.

Referring now more particularly to the characters of reference on the drawings, and particularly at present to Figs. 1 to 4, the mold comprises two semi-circular sections 1 and 2 arranged in opposed and alined relation to each other to form a complete circle. Each section is formed with a deep peripheral groove 3 on its inner face to receive and seat the tread portion 4 of a tire 5 therein as usual. These sections also have circular steam chambers extending substantially from end to end thereof.

The sections 1 and 2 are connected at one end by links 7 pivoted onto both sections. These links are arranged so that when the sections are in closed relation to each other, the ends of the sections at the links will abut. In order to insure that the inner peripheries of the grooves 3 of the adjacent sections line up with each other, regardless of any possible wear of the link pins, an adjustable screw 8 is mounted between the links at one end thereof beyond the adjacent pivotal pin to bear against the outer face of the adjacent mold section.

Lugs 9 project outwardly from the sections at the ends thereof opposite to the links, a right and left hand screw 10 being threaded through the lugs to enable the sections to be separated or closed together at will.

A steam intake pipe 11 with a valve 12 interposed therein is connected to the steam chamber 6 of the section 1 adjacent one end thereof; and a drain-pipe 13 with a valve 14 interposed therein is connected to said steam chamber adjacent its other end. A flexible steam hose 15 extends between the steam chambers of the two sections at one end; while a similar hose 16 leads from the pipe 13 between the valve 14 and the section 1 to the adjacent end of the steam chamber of section 2. Detachable connection between the pipes 11 and 13 beyond the valves and the main steam pipes 17 and 18 respectively is had by means of unions 19 applied to the adjacent ends of the corresponding pairs of pipes.

Lugs 20 project outwardly from both sides of the mold sections at intervals to engage the hooked ends of the usual clamp yokes 21 which straddle the sections inwardly of the same and have centrally disposed screws 22 to project into the grooves 3 of the mold sections.

To support the mold structure in a turnable manner we provide a vertical supporting frame 23 of suitable character arranged as a supporting unit or to be secured against a wall or other permanent part of the shop as may be desired. The support carries a horizontal spindle 24 which passes through the hub 25 of a spider having radial arms 26. Certain ones of these arms are permanently secured onto the section 1 on one side thereof, while the other spider arm 26ª has a slot 27 concentric with the center of turning of the section 2 on its hinge links. A pin 28 mounted in the side of the section 2 adjacent the spider rides in the slot 27.

In operation the unions 19 are disconnected and the sections are separated by turning the screw 10 sufficient to enable a tire to pass between the sections 1 and 2 from the outer faces thereof with but little if any distortion of the tire. The sections are then closed up by turning the screw 10 in the opposite direction.

A continuous heavy rubber pad or link 29 is then placed inside the tire, on which pad are placed bands 30 of spring steel arranged to form a continuous link. The lowermost clamps are then applied, and the mold unit is then rotated on the spindle 24 to enable the other clamps to be applied to the then lowermost ones of the lugs 20; the rotation being carried on intermittently until all the clamps have been applied.

The unions 19 of the cooperating pipes 11 and 17, 13 and 18 are then coupled up and steam is admitted into the steam chambers 6 for the time necessary to accomplish the desired results.

The operations above described are then reversed to enable the tire to be removed.

Figure 5:
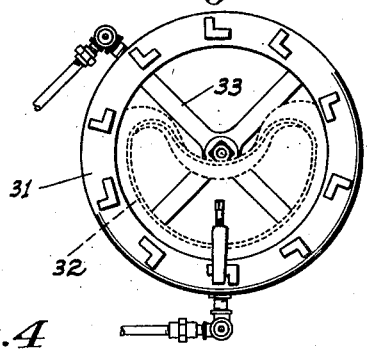
Fig. 5 is a side elevation of a mold of continuous and unbroken construction for use with small and easily flexed or collapsed tires.
Figure 4:
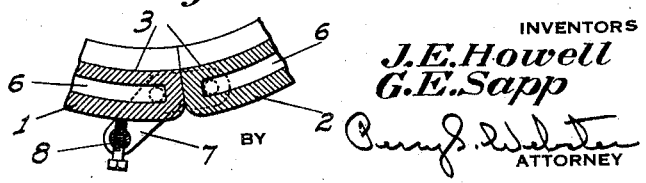
Fig. 4 is a fragmentary section of the mold sections at one end showing the adjusting leveling screw.

In the type of device shown in Fig. 5 the mold is in the form of a single unbroken cylindrical ring 31, into the tire seating groove of which the tire 32 is forced by distorting said tire as indicated in dotted lines. This mold is also mounted on a turnable spider 33, all the arms of which are of course rigidly fixed to the mold. The steam pipe connections 34 of this mold are also detachable so as to enable the mold to be rotated for the same purpose as described in connection with the double section mold.

From the foregoing description it will be readily seen that we have produced such a device as substantially fulfills the objects of the invention as set forth herein.

While this specification sets forth in detail the present and preferred construction of the device, still in practice such deviations from such details may be resorted to as do not form a departure from the spirit of the invention, as defined by the appended claims.

Having thus described our invention what we claim as new and useful and desire to secure by Letters Patent is:

1. A tire vulcanizing mold comprising hollow sections to completely surround a tire, means connecting the sections and supporting one from the other to enable them to be separated or brought together at will, and supporting means secured to only one section, said means being turnable axially of said section.

2. A tire vulcanizing mold including hollow sections to completely surround a tire, hinge means connecting the sections at adjacent ends, said hinge means comprising side links onto which the sections are separately pivoted, and an adjustable screw mounted on the links and bearing against the outer periphery of one section.

3. A tire vulcanizing mold comprising a ring-like structure to completely surround a tire and provided with a circumferential groove in its inner periphery to receive the tread portion of a tire, a fixed spindle supported only at one end, and a spider turnable on the spindle and connected to one side of the structure.

4. A tire vulcanizing mold comprising hollow sections to completely surround a tire, means connecting the sections to enable them to be separated or brought together at will, a spider fixed only onto one section, and a horizontal spindle for said spider disposed concentric with said section and supported only at one end.

5. A tire vulcanizing mold comprising hollow sections to completely surround a tire, means connecting the sections to enable them to be separated or brought together at will, a spider fixed only onto one section, means for supporting said spider, and means between the spider and the other section for limiting the separating movement of the sections.

6. A tire vulcanizing mold comprising hollow sections to surround a tire, pivot means connecting the sections at one end to enable them to be separated or brought together at will, a spider fixed only onto one section, means for supporting the spider, an arm projecting from the spider past and adjacent the other section, said arm having a slot concentric with the pivot means, and a pin projecting from the said other section and riding in the slot.

In testimony whereof we affix our signatures.

JOHN E. HOWELL.
GEORGE E. SAPP.